United States Patent
Takagi

(10) Patent No.: US 10,028,191 B2
(45) Date of Patent: Jul. 17, 2018

(54) SYSTEM AND METHOD FOR DUAL MODE COMMUNICATION BETWEEN COMMUNICATION DEVICES

(71) Applicant: CANON KABUSHIKI KAISHA, Tokyo (JP)

(72) Inventor: Toshiyuki Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/586,070

(22) Filed: May 3, 2017

(65) Prior Publication Data
US 2017/0332298 A1    Nov. 16, 2017

(30) Foreign Application Priority Data

May 11, 2016 (JP) .................. 2016-095512

(51) Int. Cl.
*H04W 36/14* (2009.01)
*H04M 1/725* (2006.01)
(Continued)

(52) U.S. Cl.
CPC ......... *H04W 36/14* (2013.01); *H04M 1/7253* (2013.01); *H04W 36/0011* (2013.01); *H04W 76/025* (2013.01); *H04W 76/15* (2018.02)

(58) Field of Classification Search
CPC ......... H04W 4/02; H04W 4/08; H04W 36/00; H04W 36/11; H04W 36/14; H04W 36/16; H04W 36/24; H04W 36/30; H04W 36/32; H04W 36/34; H04W 36/36; H04W 76/00; H04W 76/025; H04W 76/027; H04W 76/028; H04W 76/06; H04W 88/00; H04W 88/02; H04W 88/06; H04W 88/08; H04W 88/10; H04W 92/00; H04W 92/18; H04M 1/725; H04M 1/0264; H04M 1/7253; H04M 3/42246

See application file for complete search history.

(56) References Cited

U.S. PATENT DOCUMENTS 9,497,586 B2 * 11/2016 Akizuki .................. H04W 4/02
9,801,111 B2 * 10/2017 Ohman .................. H04W 36/26
(Continued)

FOREIGN PATENT DOCUMENTS

JP   2015-088789 A   5/2015

*Primary Examiner* — Meless Zewdu
(74) *Attorney, Agent, or Firm* — Cowan, Liebowitz & Latman, P.C.

(57) ABSTRACT

A communication apparatus that communicates with an external apparatus to transmit data to the external apparatus, the communication apparatus comprising, a first communication unit configured to communicate with the external apparatus in accordance with a first communication method, a second communication unit configured to communicate with the external apparatus in accordance with a second communication method, and a control unit configured to control operation in the first communication unit and the second communication unit, wherein the control unit controls so as to switch communication with the external apparatus to second communication by the second communication unit after performing first communication by the first communication unit, and transmit transmission target data to the external apparatus in the second communication.

13 Claims, 7 Drawing Sheets

(51) Int. Cl.
*H04W 76/02* (2009.01)
*H04W 36/00* (2009.01)
*H04W 76/15* (2018.01)

(56) References Cited

U.S. PATENT DOCUMENTS

| | | | |
|---|---|---|---|
| 2008/0244350 A1* | 10/2008 | de Carvalho | H04B 7/061 |
| | | | 714/748 |
| 2011/0249075 A1* | 10/2011 | Abuan | H04N 7/147 |
| | | | 348/14.02 |
| 2013/0273916 A1* | 10/2013 | Gupta | H04W 36/34 |
| | | | 455/436 |
| 2013/0294358 A1* | 11/2013 | Kim | H04W 72/12 |
| | | | 370/329 |
| 2014/0313878 A1* | 10/2014 | Zhou | H04L 1/1893 |
| | | | 370/216 |
| 2016/0021613 A1* | 1/2016 | Mani | H04W 52/0209 |
| | | | 370/311 |
| 2016/0036715 A1* | 2/2016 | Akazawa | H04L 69/04 |
| | | | 370/392 |
| 2016/0056927 A1* | 2/2016 | Liu | H04W 28/04 |
| | | | 370/216 |
| 2016/0057667 A1* | 2/2016 | Rao | H04W 76/027 |
| | | | 455/441 |
| 2016/0262185 A1* | 9/2016 | Ghosh | H04W 72/04 |
| 2017/0142741 A1* | 5/2017 | Kaur | H04W 72/121 |
| 2017/0156076 A1* | 6/2017 | Eom | H04W 4/70 |
| 2017/0208129 A1* | 7/2017 | Maguire | H04L 67/125 |

\* cited by examiner

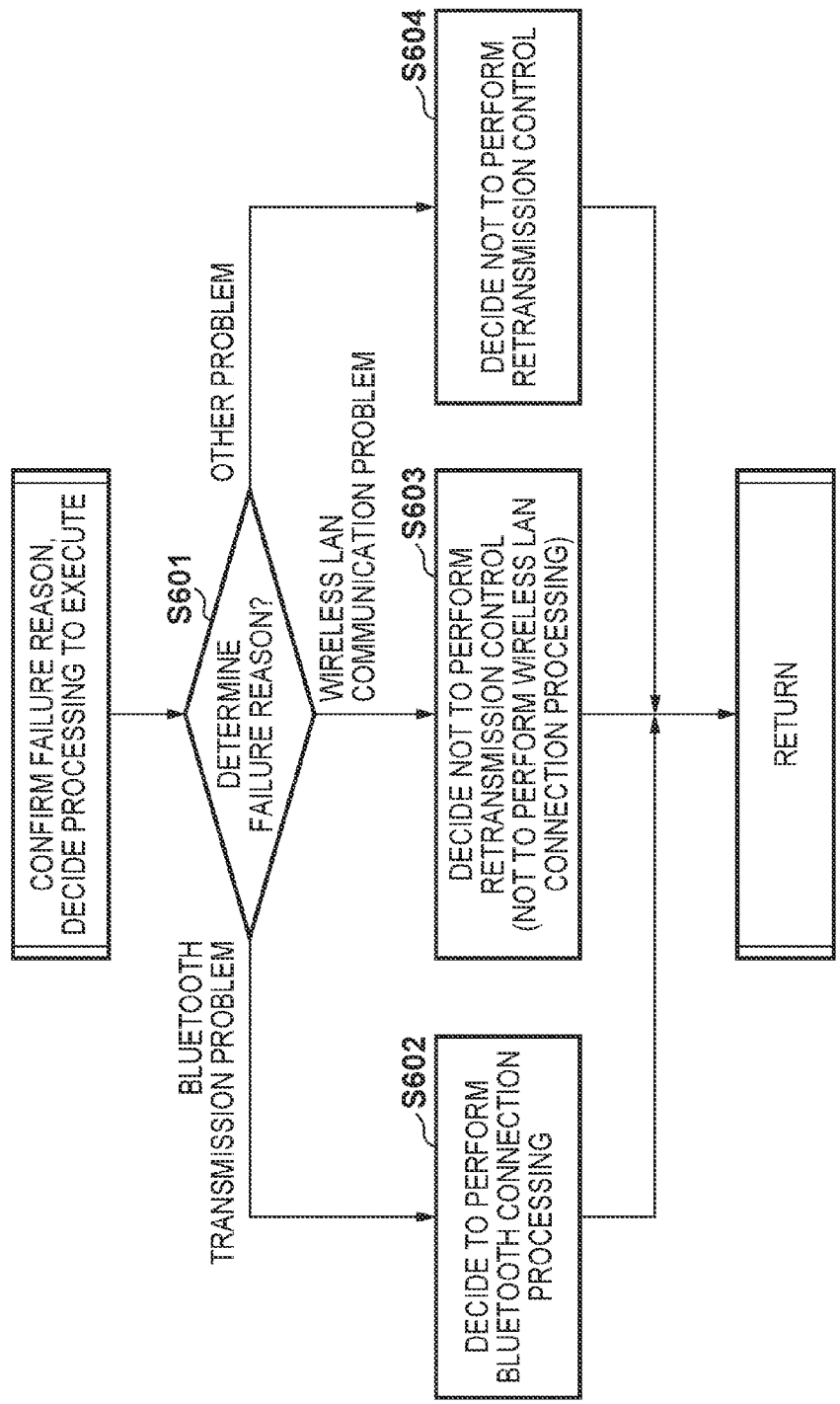

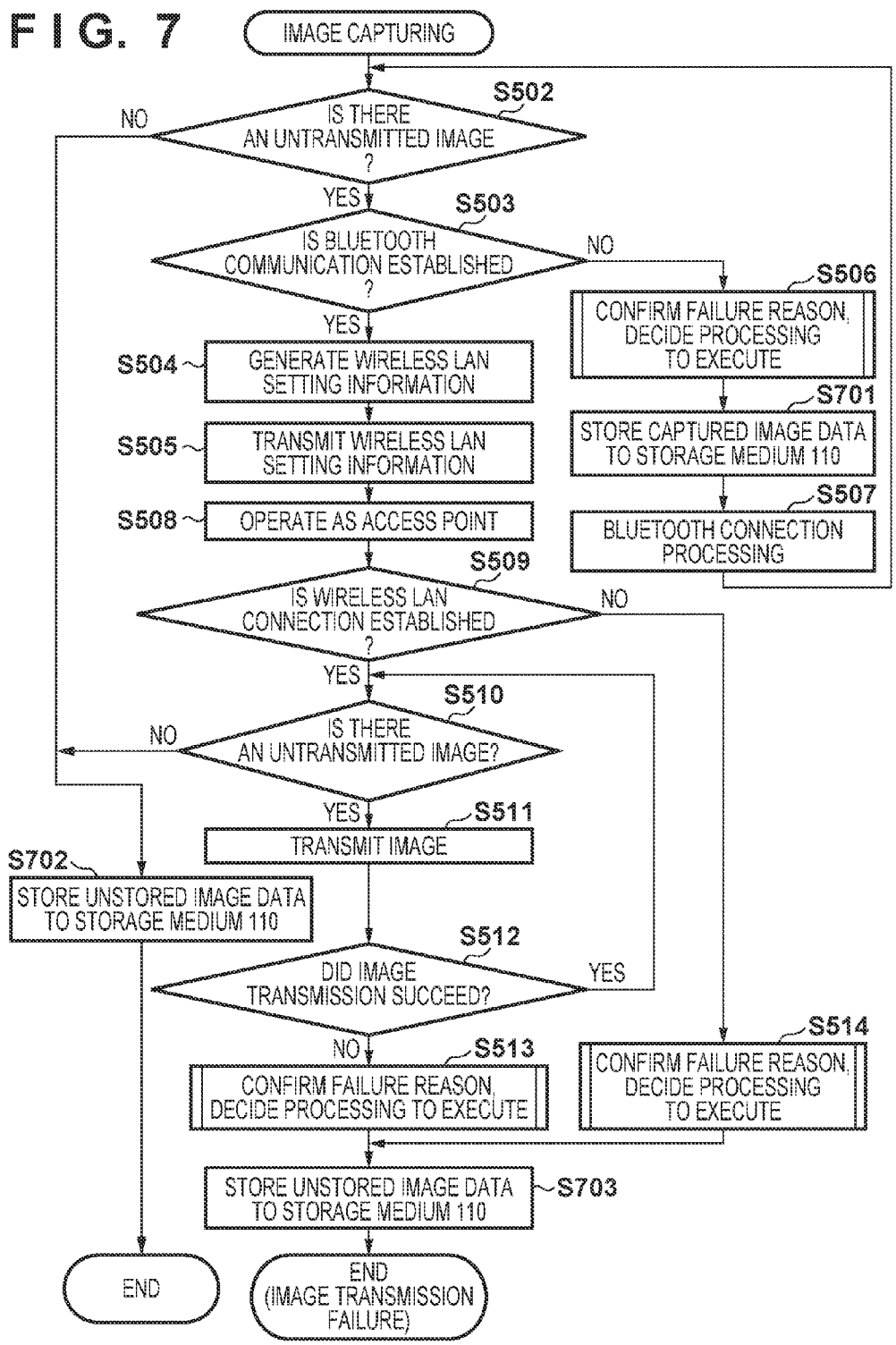

SYSTEM AND METHOD FOR DUAL MODE COMMUNICATION BETWEEN COMMUNICATION DEVICES

BACKGROUND OF THE INVENTION

Field of the Invention

The invention relates to a communication apparatus, a method of controlling a communication apparatus, and a storage medium.

Description of the Related Art

In a case of performing wireless communication between a plurality of communication devices, it is possible to use communication methods that differ in accordance with a communication distance. In such a case, data transmission/reception between devices can be performed after switching the communication method in accordance with the communication distance.

In particular, in recent years a handover technique for handing over communication to wireless LAN communication after using short-range wireless communication such as Bluetooth (registered trademark) to perform authentication is getting attention. For example, a method is proposed in which, in a case of performing data transmission/reception between devices, Bluetooth communication is used with an objective of exchanging information for wireless LAN connection, and thereafter wireless LAN communication is switched to by a handover to perform a data transmission between the devices (refer to Japanese Patent Laid-Open No. 2015-088789).

However, in the method proposed by Japanese Patent Laid-Open No. 2015-088789, Bluetooth advertising is performed in accordance with a predetermined trigger and a Bluetooth connection with a desired device is performed, but operation in a case where the Bluetooth connection failed is not envisioned.

In particular, although Bluetooth communication has lower power consumption than a wireless LAN connection, conversely, in comparison to a wireless LAN connection, Bluetooth communication has reduced output, a shorter distance in which communication is possible, and a slower communication speed. Accordingly, if a Bluetooth connection fails or if wireless LAN communication fails, what control to subsequently execute is an important point in relation to the performance of a device.

SUMMARY OF THE INVENTION

The invention provides a technique for enabling control, which differs in accordance with a communication method, for a communication error that occurs when performing data transmission between devices after switching to communication a different communication method in accordance with a handover.

One aspect of embodiments of inventions relates to a communication apparatus that communicates with an external apparatus to transmit data to the external apparatus, the communication apparatus comprising, a first communication unit configured to communicate with the external apparatus in accordance with a first communication method, a second communication unit configured to communicate with the external apparatus in accordance with a second communication method, and a control unit configured to control operation in the first communication unit and the second communication unit, wherein the control unit controls so as to switch communication with the external apparatus to second communication by the second communication unit after performing first communication by the first communication unit, and transmit transmission target data to the external apparatus in the second communication, the control unit sets a frequency, for repeatedly executing connection processing in accordance with the first communication method by controlling the first communication unit to establish the first communication in a case where the first communication cannot be established before the second communication, to be higher than a frequency for repeatedly executing connection processing in accordance with the second communication method by controlling the second communication unit to establish the second communication in a case where the second communication cannot be established after establishing the first communication, and the first communication has power consumption that is at least lower than that of the second communication.

Further features of the present invention will become apparent from the following description of exemplary embodiments (with reference to the attached drawings).

BRIEF DESCRIPTION OF THE DRAWINGS

FIG. 6 is a flowchart for illustrating an example of processing relating to retransmission control corresponding to an embodiment of the invention.

FIG. 7 is a flowchart that illustrates an example of operation of the communication apparatus 100 that corresponds to a second embodiment of the invention.

DESCRIPTION OF THE EMBODIMENTS

The attached drawings are used to give an explanation in detail below regarding embodiments for working the invention.

Note that embodiments explained below are exemplary implementation of the invention, and may be appropriately modified or changed in accordance with various conditions or a configuration of an apparatus to which the invention is applied. In addition, it is possible to appropriately combine embodiments.

First Embodiment

<Configuration of Communication Apparatus 100>

Figure 1A:
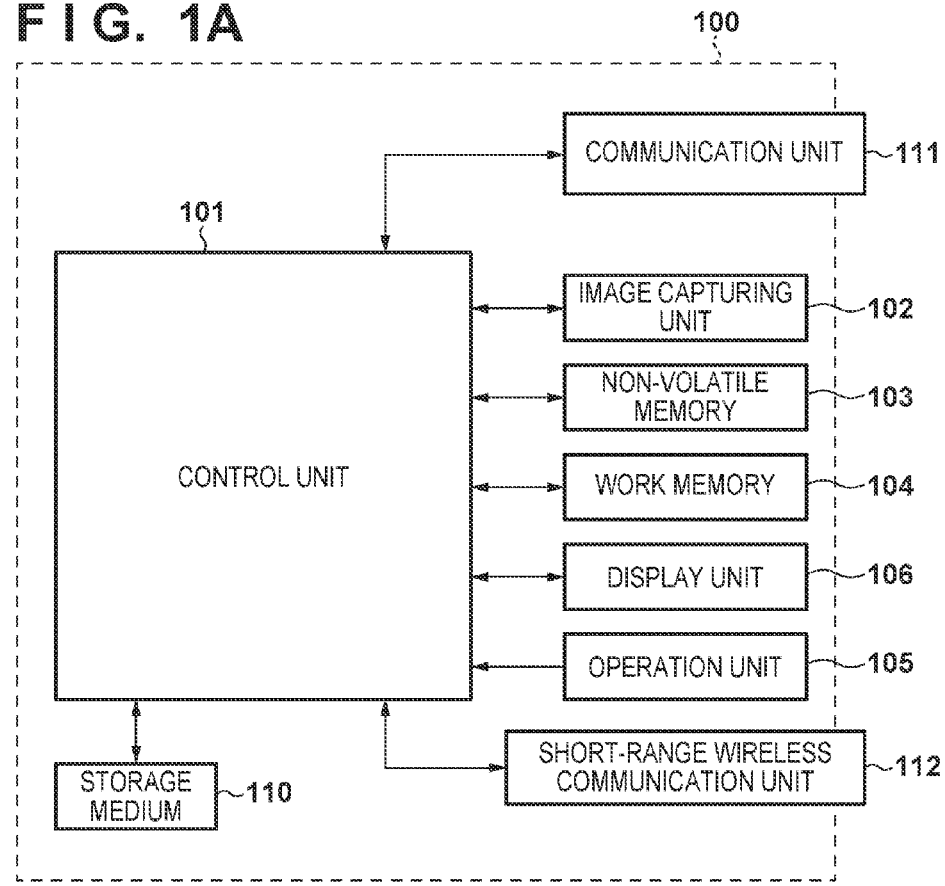
FIG. 1A is a block diagram that illustrates an example of a configuration of a communication apparatus 100 that corresponds to an embodiment of the invention.

FIG. 1A is a block diagram illustrating an example of a configuration of a digital camera as an image capturing apparatus which is an example of a communication apparatus 100 of the present embodiment. Although a digital camera is given as an example for the communication apparatus 100 in the explanation of this and following embodiments, embodiments of the communication apparatus 100 are not limited to a digital camera. For example, the communication apparatus 100 can be any information processing apparatus, image capturing apparatus, information generation apparatus, or data generation device that has image capturing capabilities or an audio recording function, such as a personal computer, a mobile telephone, a smart phone, a PDA, a tablet device, a digital video camera, or a mobile media player. With reference to FIG. 1A, explanation of a configuration of the communication apparatus 100 is given in detail below.

A control unit 101 controls each unit of a digital camera 100 in accordance with an inputted signal or a program that is described later. Note that, instead of the control unit 101 controlling the apparatus as a whole, configuration may be taken such that the apparatus as a whole is controlled by distributing processing among a plurality of pieces of hardware.

An image capturing unit 102 is configured by, for example, an optical lens unit, an optical system for controlling an aperture/zoom/focus or the like, an image capturing element for converting light (a video image) that is introduced via the optical lens unit into an electric video image signal. As an image capturing element, typically a CMOS (Complementary Metal Oxide Semiconductor) sensor or a CCD (Charge Coupled Device) is used. By being controlled by the control unit 101, the image capturing unit 102 converts a subject light beam formed by a lens included in the image capturing unit 102 to an electrical signal by the image capturing element, and performs noise reduction processing thereon to output digital data as image data. In the present embodiment, a series of processes for capturing and outputting the image data is referred to as "image capturing". In the digital camera 100 of the present embodiment, the image data is stored in a storage medium 110, in accordance with a specification for DCF (Design Rule for Camera File system). In the present embodiment, the image capturing unit 102 is included as a configuration element because explanation giving a digital camera as an example of the communication apparatus 100 is made, but the communication apparatus 100 does not necessarily need to be configured by including the image capturing unit 102.

A non-volatile memory 103 is a non-volatile memory that can be electrically deleted/recorded to, and for example stores a program described later that is executed by the control unit 101. A work memory 104 is used as a buffer memory for temporarily holding image data captured by the image capturing unit 102, an image display memory for a display unit 106, a work area for the control unit 101, and the like.

An operation unit 105 is a user interface for accepting an instruction with respect to the digital camera 100 from a user. The operation unit 105 can include, for example, a power button for a user to instruct ON/OFF of a power supply of the digital camera. 100, a release switch to instruct image capturing, a moving image capturing switch to instruct moving image capturing, a reproduction button to instruct reproduction of image data, or the like. Furthermore, it may include an operation member such as a dedicated connection button to start communication with an external apparatus via a communication unit 111 that is described later. In addition, a touch panel formed in the display unit 106 may be included in the operation unit 105. Note that the release switch has a SW1 and a SW2. The SW1 becomes ON by the release switch entering a so-called half-stroke state. By this, an instruction is accepted for performing imaging preparation, such as AF (auto focus) processing, AE (automatic exposure) processing, AWB (auto white balance) processing, EF (pre-flashing) processing, or the like. The SW2 becomes ON by the release switch entering a so-called full pressing state. By this, an instruction for performing capturing is accepted.

The display unit 106 performs display of a viewfinder image when image capturing, display of captured image data, text display for interactive operation, or the like. The display unit 106 is not necessarily integrated with the digital camera 100, and configuration may be taken such that it is connected to the digital camera 100. Configuration may be taken such that the digital camera 100 can connect to an internal or external display unit 106 and has at least a display control function for controlling display of the display unit 106. The storage medium 110 can store image data outputted from the image capturing unit 102. The storage medium 110 may be configured so as to be capable of attachment/detachment with respect to the digital camera 100, or may be integrated in the digital camera 100. It is sufficient if the digital camera 100 can at least access the storage medium 110.

The communication unit 111 is an interface for connecting with the external apparatus 200. The digital camera 100 of the present embodiment can exchange data with the external apparatus 200, via the communication unit 111. For example, it is possible to transmit image data generated by the image capturing unit 102 to the external apparatus 200 via the communication unit 111. Note that, in the present embodiment, the communication unit 111 includes an interface for communicating with the external apparatus 200 by a so-called wireless LAN which is in accordance with an IEEE 802.11 specification. The control unit 101 realizes wireless communication with the external apparatus by controlling the communication unit 111. Note that a communication method is not limited to a wireless LAN, and may include an infrared communication method for example.

A short-range wireless communication unit 112 configured from an antenna for wireless communication, a modulation/demodulation circuit for processing a wireless signal, and a communication controller, for example. The short-range wireless communication unit 112 realizes short-range wireless communication with the external apparatus 200 in accordance with an IEEE 802.15 specification (so-called Bluetooth (registered trademark)) by outputting a modulated wireless signal from the antenna and demodulating a wireless signal received by the antenna. For the Bluetooth (registered trademark) communication in the present embodiment, version 4.0 of Bluetooth (registered trademark) Low Energy (hereinafter abbreviated as BLE) which has low power consumption is applied. BLE communication has a smaller range in which communication is possible compared to wireless LAN communication (has a shorter distance in which communication is possible), and has a slower communication speed than wireless LAN communication. In contrast, BLE communication has lower power consumption than wireless LAN communication. In addition, BLE communication has a slower communication speed than Bluetooth 3.0 communication. In contrast, BLE communication has lower power consumption than Bluetooth 3.0 communication.

In the present embodiment, a communication speed of communication realized by the communication unit 111 is faster than a communication speed for communication realized by the short-range wireless communication unit 112. In addition, communication realized by the communication unit 111 has a broader range in which communication is possible, in comparison to communication by the short-range wireless communication unit 112.

Note that the communication unit 111 can have an AP mode for operating as an access point in an infrastructure mode, and a CL mode for operating as a client in the infrastructure mode. Upon causing the communication unit 111 to operate in the CL mode, the digital camera 100 operates as a CL device in the infrastructure mode.

If the digital camera 100 operates as a CL device, by connecting to an AP device in a periphery, it as possible to participate in a network formed by the AP device. In addition, by causing the communication unit 111 to operate in the AP mode, the digital camera 100 in the present embodiment can operate as a simplified AP (hereinafter, a simple AP) which is a type of an AP in which functions are more limited. When the digital camera 100 operates as a simple AP, the digital camera 100 forms a network by itself. An apparatus in a periphery of the digital camera 100 can recognize the digital camera 100 as an AP device, and participate in a network formed by the digital camera 100. A program for causing the digital camera 100 to operate as described above is assumed to be held in the non-volatile memory 103.

Note that, although the digital camera 100 in the present embodiment is a type of AP, at is a simple AP that does not have a gateway function for transmitting data received from a CL device to an Internet provider or the like. Accordingly, even if data from another apparatus that is participating in a network formed by the self-apparatus is received, it cannot be transmitted to a network such as the Internet.

In addition, although not illustrated in FIG. 1A, the communication apparatus is provided with a microphone for accepting audio input, and can generate audio data from audio inputted by the microphone.

Figure 1B:
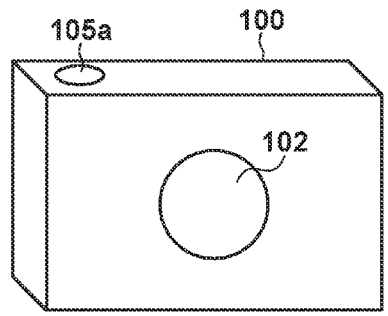
FIG. 1B and FIG. 1C are views for illustrating an example of an outer appearance of a digital camera that is one embodiment of a communication apparatus.
Figure 1C:
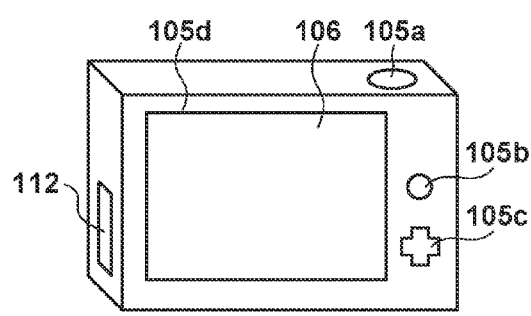

Next, explanation is given regarding an outer appearance of the digital camera 100. FIG. 1B and FIG. 1C are views for illustrating an example of an outer appearance of the digital camera 100. A release switch 105*a*, a reproduction button 105*b*, directional keys 105*c*, and a touch panel 105*d* are operation members that are included in the operation unit 105 previously described. In addition, the display unit 106 displays an image obtained as a result of capturing by the image capturing unit 102. In addition, the digital camera 100 of the present embodiment has an antenna portion for the short-range wireless communication unit 112 on a side surface of the camera body. This concludes the explanation of the digital camera as the communication apparatus 100.

<Configuration of External Apparatus 200>

Figure 2:
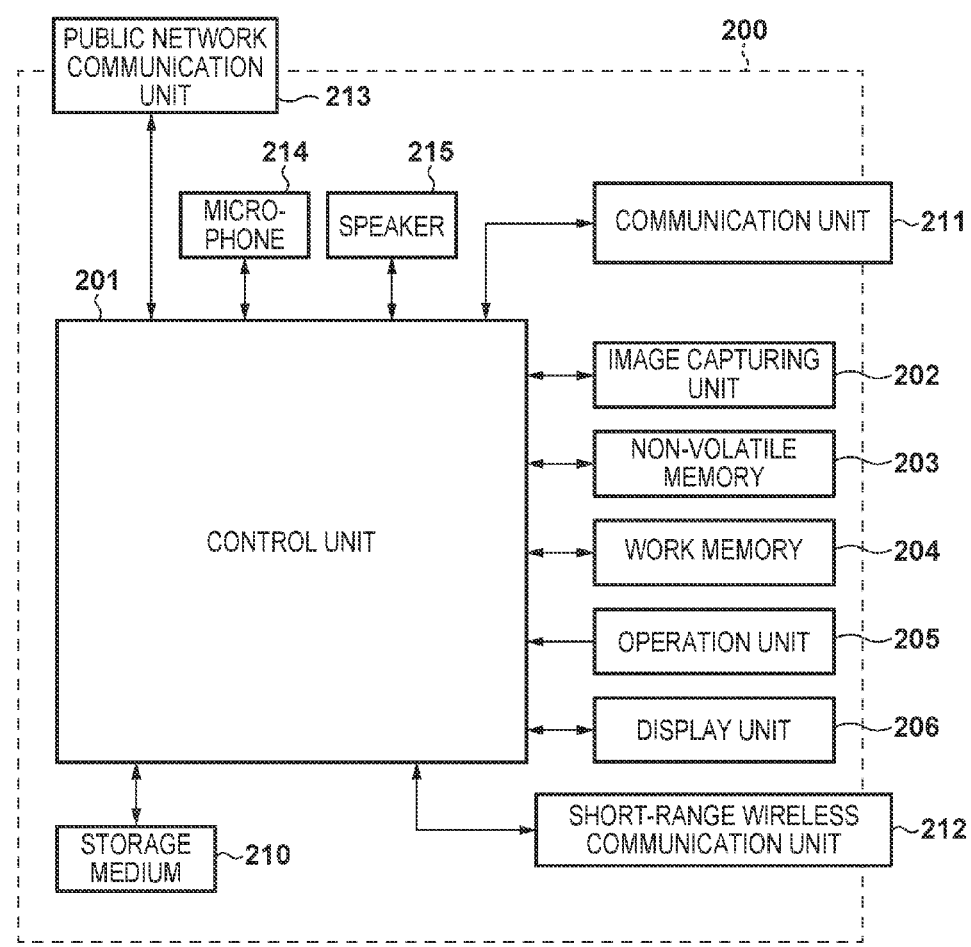
FIG. 2 is a block diagram that illustrates an example of a configuration of an external apparatus 200 that corresponds to an embodiment of the invention.

Next, explanation is given for an example of a configuration of an information processing apparatus as the external apparatus 200 that communicates with the communication apparatus 100. FIG. 2 is a block diagram illustrating an example of a configuration of a mobile telephone as an information processing apparatus which is an example of the external apparatus 200 of the present embodiment. Although a mobile telephone is given as an example for the external apparatus 200 in an explanation of this and following embodiments, an embodiment of the external apparatus 200 is not limited to a mobile telephone. For example, the external apparatus 200 can be any information processing apparatus, such as a digital camera, a smart phone, a PDA, a tablet device, a digital video camera, or a mobile media player. With reference to FIG. 2, explanation is given in detail below of a configuration of the mobile telephone 200.

A control unit 201 controls each unit of the mobile telephone 200 in accordance with an inputted signal or a program that is described later. Note that, instead of the control unit 201 controlling the apparatus as a whole, configuration may be taken such that the apparatus as a whole is controlled by distributing processing among a plurality of pieces of hardware. An image capturing unit 202 converts a subject light beam formed by a lens included in the image capturing unit 202 into an electrical signal, performs noise reduction processing or the like, and outputs digital data as image data. After captured image data is stored in a buffer memory, predetermined calculations are performed in the control unit 201, and the image data is stored in a storage medium 210. In addition, it is possible to control each unit to execute data generation processing for generating predetermined data in accordance with an input from an operation unit 205.

A non-volatile memory 203 is a non-volatile memory that can be deleted and recorded on electronically. The non-volatile memory 203 stores an OS (operating system) that is basic software executed by the control unit 201, and applications that realize practical functions in cooperation with the OS. In addition, in the present embodiment, the non-volatile memory 203 stores an application (hereinafter, an app) for communicating with the digital camera 100. A work memory 204 is used as a memory for image display for a display unit 206, a work area of the control unit 201, or the like.

The operation unit 205 is used for accepting, from a user, an instruction with respect to the mobile telephone 200. The operation unit 205 includes an operation member such as a power button for a user to instruct ON/OFF of a power supply of the mobile telephone 200, a touch panel formed in the display unit 206, or the like for example. The display unit 206 performs display of image data, text display for an interactive operation, or the like. Note that the display unit 206 does not necessarily need to be provided by the mobile telephone 200. Configuration may be taken such that the mobile telephone 200 can connect to the display unit 206 and has at the least a display control function for controlling display of the display unit 206.

The storage medium 210 can store image data outputted from the image capturing unit 202. The storage medium 210 may be configured so as to be capable of attachment/detachment with respect to the mobile telephone 200, or may be integrated in the mobile telephone 200. In other words, it is sufficient if the mobile telephone 200 can access the storage medium 210 at least.

A communication unit 211 is an interface for connecting with another apparatus such as the communication apparatus 100. The mobile telephone 200 of the present embodiment can exchange data with the digital camera 100 via the communication unit 211 and the communication unit 111 of the digital camera 100. In the present embodiment, the communication unit 211 includes an antenna, and the control unit 201 can connect with the digital camera 100 via the antenna. Note that a connection with the digital camera 100 may be a direct connection, or may be a connection via an access point. As a protocol for communicating data, it is possible to use PTP/IP (Picture Transfer Protocol over Internet Protocol) via a wireless LAN for example. Note that communication with the digital camera 100 is not limited to this. For example, the communication unit 211 may employ an infrared communication module or a wireless communication module such as for wireless USE.

A short-range wireless communication unit 212 realizes non-contact short range communication with another apparatus such as the communication apparatus 100. The short-range wireless communication unit 212 is configured from an antenna for wireless communication, a modulation/demodulation circuit for processing a wireless signal, and a communication controller, for example. The short-range wireless communication unit 212 realizes short-range wireless communication with the communication apparatus 100 which is an external apparatus in accordance with the foregoing BLE version 4.0 by outputting a modulated wireless signal from the antenna and demodulating a wireless signal received by the antenna.

A public network communication unit 213 is an interface used when performing public wireless communication, and realizes communication that uses a public network via a base station. The mobile telephone 200 realizes, via the public network communication unit 213, public wireless communication in accordance with a specification such as W-CDMA (UMTS) or LTE (Long Term Evolution), and can perform a call or communication with another device. In this case, the control unit 201 realizes the call by performing input and output of an audio signal via a microphone 214 and a speaker 215. In the present embodiment, the public network communication unit 213 is an antenna, and the control unit 201 can connect with a public network via the antenna. Note that the communication unit 211 and the public network communication unit 213 can share one antenna. This concludes the explanation of the mobile telephone 200.

FIG. 2 was explained as an example of a configuration of the external apparatus 200, but the communication apparatus 100 may have a similar configuration to that of FIG. 2. In such a case, similarly to the communication unit 111, the communication unit 211 has an AP mode and a CL mode, and is configured to enable operation as an access point with respect to the external apparatus 200.

<System Configuration>

Figure 3:
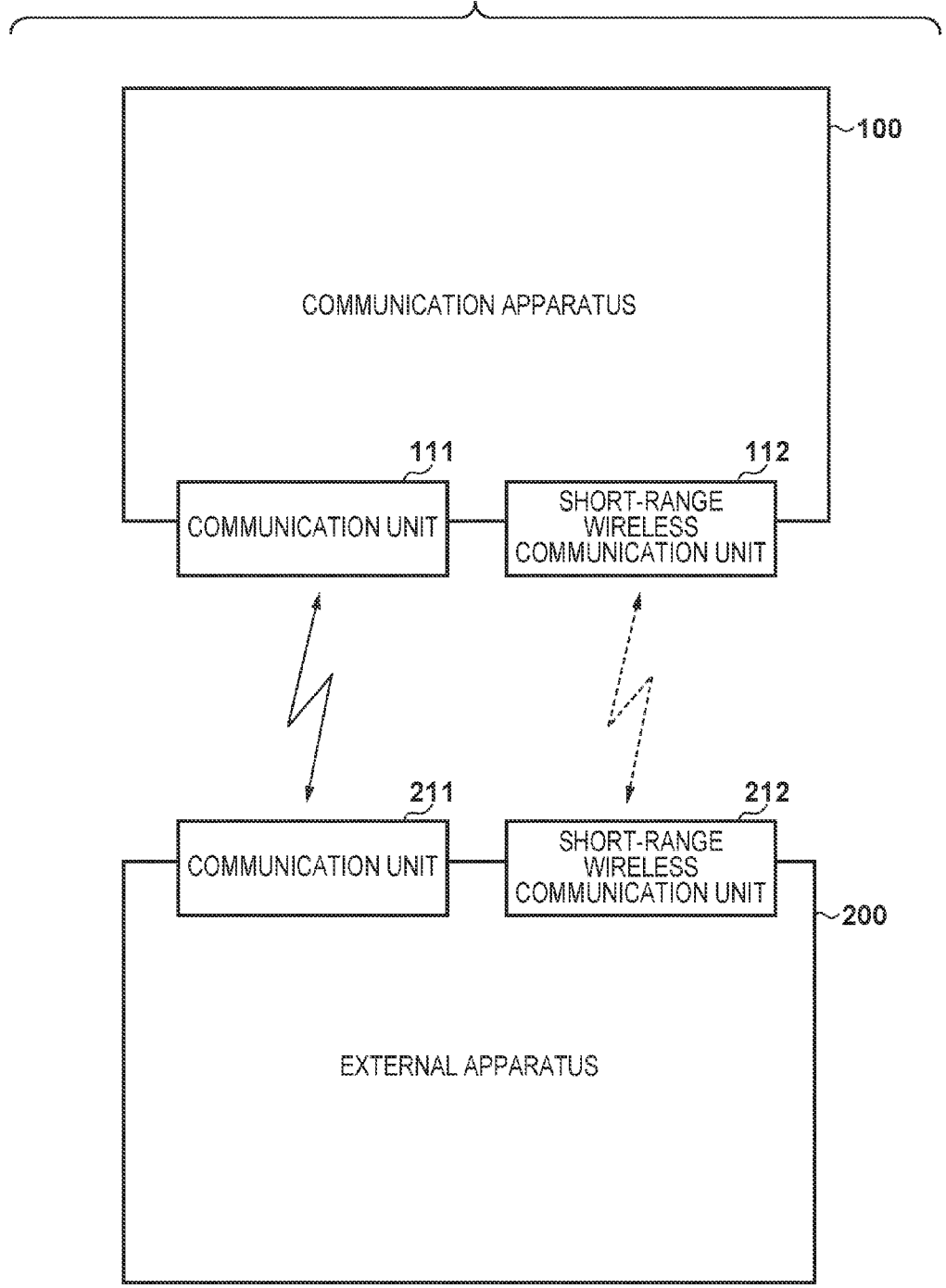
FIG. 3 is a view for illustrating an example of a system configuration that is configured by the external apparatus 200 and the communication apparatus 100 and corresponds to an embodiment of the invention.

FIG. 3 illustrates an example of an overall configuration of a communication system corresponding to an embodiment of the invention. The communication system is configured by the communication apparatus 100 explained with reference to FIG. 1 and the external apparatus 200 explained with reference to FIG. 2 being wirelessly connected. The communication apparatus 100 and the external apparatus 200 can perform wireless communication in accordance with the first communication method, via the short-range wireless communication unit 112 and the short-range wireless communication unit 212. In addition, it is possible to perform wireless communication in accordance with a second communication method that differs to the first communication method, via the communication unit 111 and the communication unit 211. In the example described above, the first communication method is set as a Bluetooth communication (BLE communication) method, and the second communication method is set as a wireless LAN communication method. In the case of the wireless LAN method, the communication apparatus 100 has an access point function, and the mobile telephone 200 can execute communication by a method for connecting in the infrastructure mode to a wireless LAN network generated by the communication apparatus 100.

<Handover Sequence>

Explanation is given below of a sequence for a switch from the first communication method to the second communication method, in other words a handover, corresponding to an embodiment of the invention. The sequence is executed by each of the processing blocks, including the short-range wireless communication unit. 212, based on control by the control unit 101 in the communication apparatus 100 which is a digital camera. In addition, in the external apparatus 200 which is a mobile telephone, each of the processing blocks including the short-range wireless communication unit 112 executes based on control by the control unit 201.

Explanation is given below of a case in which, as an example, a handover is made from a Bluetooth communication (in particular, BLE communication) method as the first communication method to wireless LAN communication as the second communication method. In addition, explanation is given where, between the digital camera 100 and the mobile telephone 200 in FIG. 4, pairing by Bluetooth communication is already complete and Bluetooth communication is established. In accordance with a release switch of the operation unit 105 being pressed to turn SW2 ON, the digital camera 100 executes image capturing processing, and also starts the sequence of FIG. 4 in parallel. If the communication apparatus 100 is not a digital camera, a sequence corresponding to FIG. 4 may be started at a point when the communication apparatus 100 has accepted an instruction for transmitting generated data to the external apparatus 200, or upon generation of predetermined data in the communication apparatus 100, for example.

When the sequence is started, in step S401 the control unit 101 determines whether or not wireless communication in accordance with a Bluetooth communication method that is the first communication method has been established with the mobile telephone 200. If Bluetooth communication is already established between the digital camera 100 and the mobile telephone 200, in step S402 the control unit 101 transmits a wireless connection request in accordance with the second communication method, in other words a wireless LAN communication method, to the mobile telephone 200 via the short-range wireless communication unit 112.

When the mobile telephone 200 receives the wireless connection request from the digital camera 100 via the short-range wireless communication unit 212, in step S403 the control unit 201 determines whether a wireless connection by the wireless LAN communication method which is the second communication method is possible. Upon determining that a wireless connection is possible, the control unit 201 in step S404 transmits a response (an affirmative response) with respect to the wireless connection request to the digital camera 100 via the short-range wireless communication unit 212.

Upon receiving an affirmative response by the mobile telephone 200 via the short-range wireless communication unit 112, the control unit 101 in step S405 generates setting information for establishing wireless LAN communication. The control unit 101, in step S406, transmits the generated setting information to the mobile telephone 200 via the short-range wireless communication unit 112. Subsequently, in step S407, by the control unit 101 controlling the communication unit 111, the digital camera 100 starts operation as an access point with respect to the mobile telephone 200. Meanwhile in the mobile telephone 200, the control unit 201 uses the setting information received via the short-range wireless communication unit 212 to control the communication unit 211, and in step S408 a wireless connection is started in accordance with the wireless LAN communication method. At this point, there are cases in which automatically performing a wireless LAN setting in accordance with a type of the mobile telephone 200 is not possible, but in such cases a user may manually perform a wireless LAN setting of the mobile telephone 200.

In this way, because the digital camera 100 functions as an access point with respect to the mobile telephone 200, step S409 wireless LAN communication is established between the digital camera 100 and the mobile telephone 200 by a method in which the mobile telephone 200 in the infrastructure mode connects to a wireless LAN network generated by the digital camera 100. Subsequently, the control unit 101 can transmit image data obtained by image capturing by the image capturing unit 102 to the mobile telephone 200 via the wireless LAN by way of the communication unit 111. In this way, it is possible to perform a handover to wireless LAN communication after the short-range wireless communication, triggered by a predetermined operation such as starting image capturing, and transmit the captured image data by the wireless LAN communication.

Figure 4:
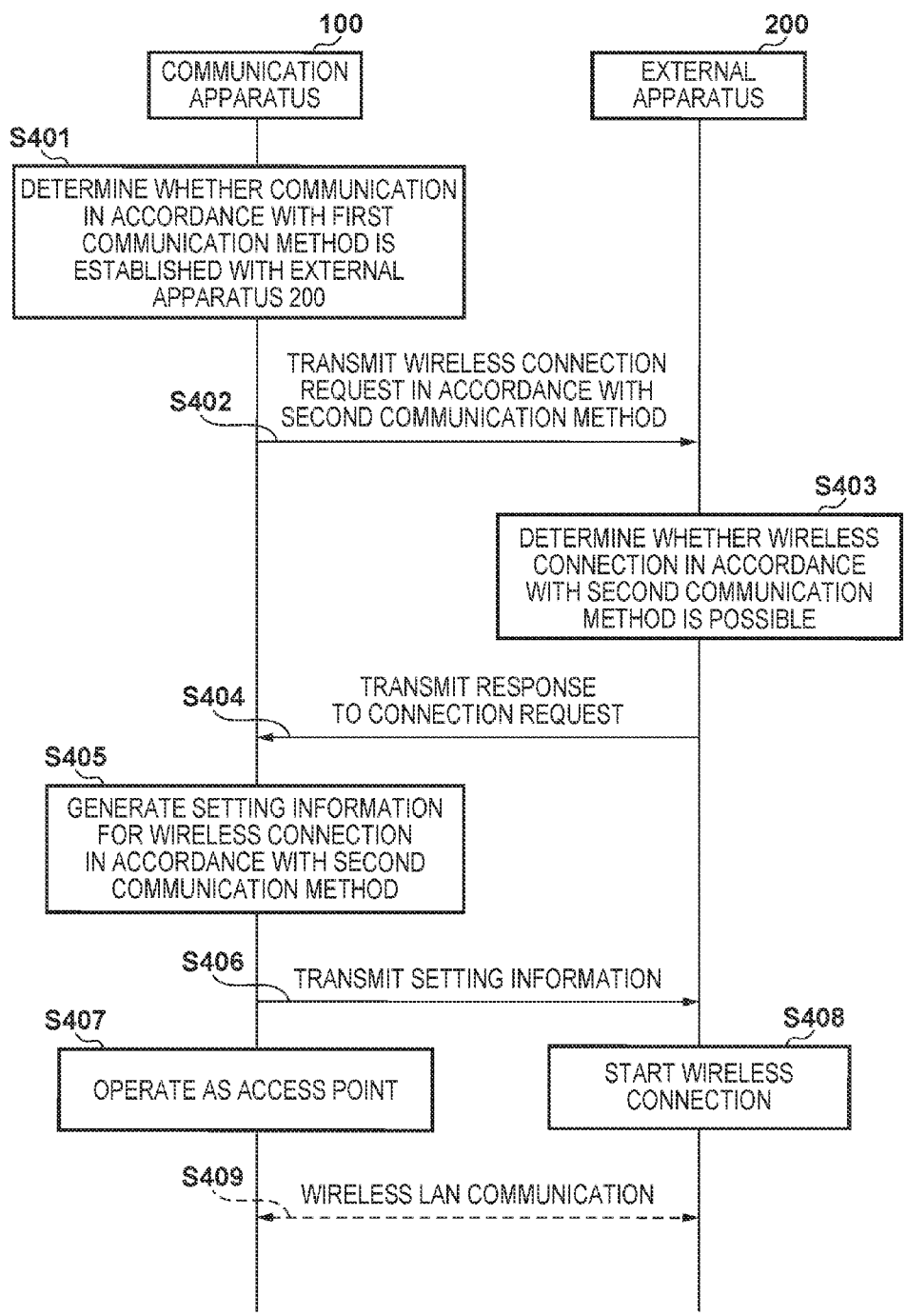
FIG. 4 is a view for illustrating an example of a handover sequence between the external apparatus 200 and the communication apparatus 100 and corresponds to an embodiment of the invention.

In FIG. 4, in step S405 and step S406 the control unit 101 generates setting information in accordance with the wireless LAN communication method and transmits it to the mobile telephone 200, but instead of performing this processing after image capturing, it may be at a time of establishment of Bluetooth communication, or configuration may be taken to generate setting information in advance while the digital camera 100 is in a standby state before image capturing is performed, and then transmit it to the mobile telephone 200. In this case, because the setting information is already shared between the digital camera 100 and the mobile telephone 200 at the start of image capturing, there is no need to perform an exchange after image capturing, and it is possible to start a wireless LAN connection more quickly.

<Handover Processing Flow>

Figure 5:
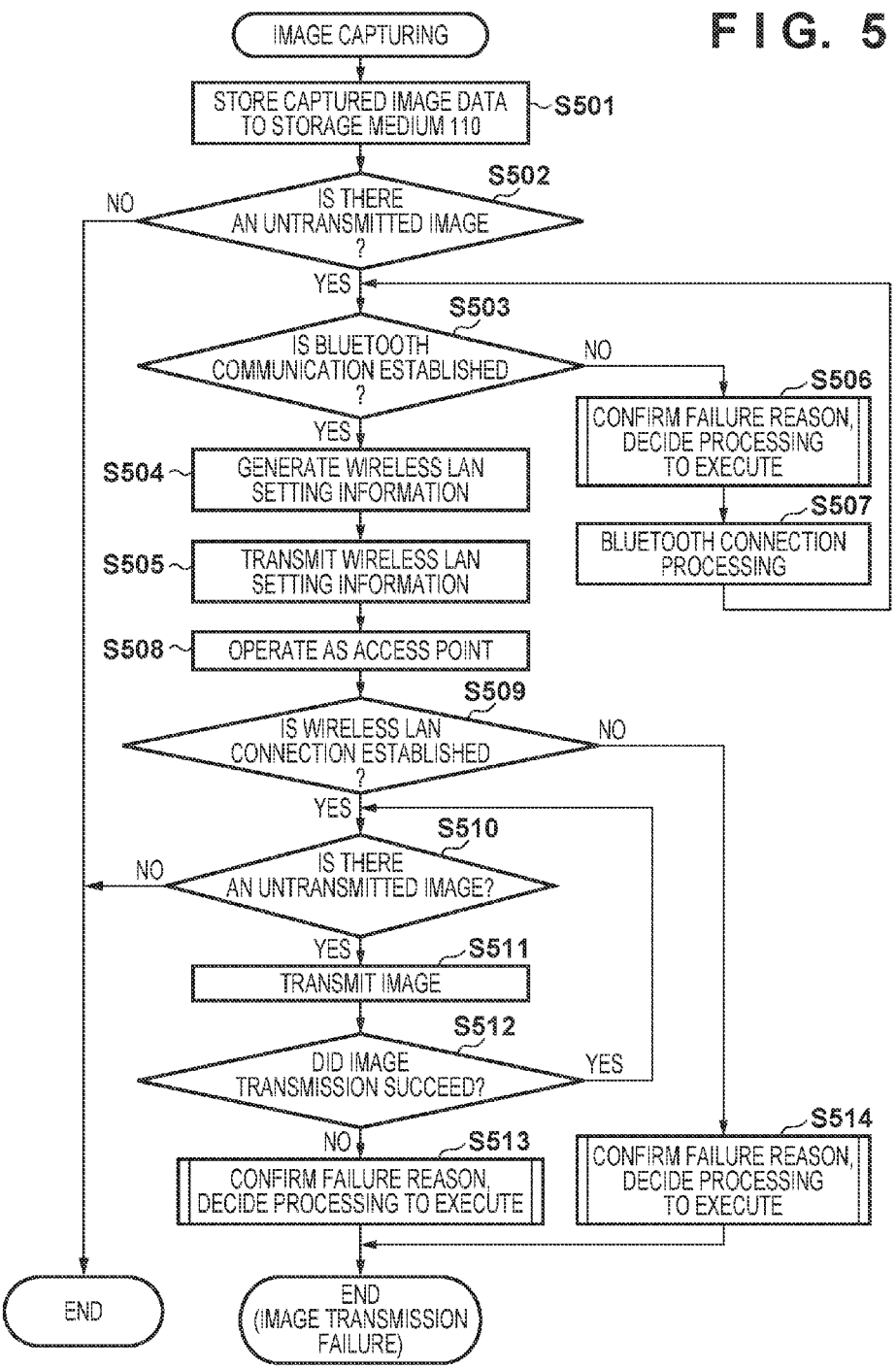
FIG. 5 is a flowchart that illustrates an example of operation of the communication apparatus 100 that corresponds to a first embodiment of the invention.

Next, explanation is given for operation of the digital camera 100 as a communication apparatus for before and after executing a handover corresponding to the operation sequence of FIG. 4. FIG. 5 is a flowchart that illustrates an example of operation of the digital camera 100. Processing illustrated in the flowchart is realized by the control unit 101 of the digital camera 100 controlling each unit of the digital camera 100 in accordance with an input signal or a program stored in the non-volatile memory 103. In addition, the processing of FIG. 5 is started in accordance with an image capturing operation in the digital camera 100. If the communication apparatus 100 is not a digital camera, processing corresponding to FIG. 5 may be started at a point when the communication apparatus 100 has accepted an instruction for transmitting generated data to the external apparatus 200, or a point when generation of predetermined data in the communication apparatus 100 is performed, for example.

The control unit 101, in accordance with the release switch of the operation unit 105 having been pressed and SW2 becoming ON, controls the image capturing unit 102 to execute image capturing processing, and in step S501 stores the captured image data to the storage medium 110. Next, in step S502 the control unit 101 determines whether there is the image data that is yet to be transmitted to the mobile telephone 200. If the control unit 101 determines that there is image data that is yet to be transmitted, the processing proceeds to step S503. Meanwhile, if the control unit 101 determines that there is no image data that is yet to be transmitted, this processing ends.

Subsequently, in step S503 the control unit 101 determines whether Bluetooth communication has been established between the digital camera 100 and the mobile telephone 200. If the control unit 101 determines that Bluetooth communication has been established, the processing proceeds to step S504. In addition, if the control unit determines that this communication has not been established, the processing proceeds to step S506. The control unit in step S504 generates setting information for establishing wireless LAN communication between the digital camera 100 and the mobile telephone 200, and in step S505 transmits the setting information to the mobile telephone 200 via the short-range wireless communication unit 112.

If the control unit 101 determines in step S503 that Bluetooth communication has not been established, it is not possible to perform a handover to wireless LAN communication. Consequently, transmission of image data to the mobile telephone 200 cannot be performed, and transmission failure occurs. Accordingly, in step S506 the control unit 101 determines a transmission failure reason, and decides processing that is to be executed subsequently. Specifically, because not being able to establish Bluetooth communication is the reason for transmission failure here, the control unit 101 decides to execute retransmission control. In such a case, the processing proceeds to step S507, and the control unit 101 controls the short-range wireless communication unit 212 to perform. Bluetooth connection processing, and waits for the establishment of Bluetooth communication with the mobile telephone 200.

Here, a distance between the digital camera 100 and the mobile telephone 200 being too great may be considered as a reason why the Bluetooth communication cannot be established. In such a case, if the distance between the digital camera 100 and the mobile telephone 200 becomes smaller, Bluetooth communication becomes possible. At this point, because power consumption is low for Bluetooth communication, configuration may be taken to perform unlimited retransmission control, and continue to wait until a Bluetooth connection with the mobile telephone 200 is possible. In addition, configuration may be taken to display an error message on the display unit 106 if Bluetooth communication cannot be established. At this point, it is possible to display a message for prompting a user make a distance between the digital camera 100 and the mobile telephone 200 smaller, such as "please place the counterparty device close to this device", for example.

After transmission of the wireless LAN setting information in step S505, in step S508 the control unit 101 controls the communication unit 111 so that the digital camera 100 operates as an access point. Subsequently, in step S509 the control unit 101 determines whether it was possible to establish a wireless LAN connection between the digital camera 100 and the mobile telephone 200. When the control unit 101 determines that it was possible to establish a wireless LAN connection, the processing proceeds to step S510. When the control unit 101 determines that at was not possible to establish a wireless LAN connection, the processing proceeds to step S514.

In step S510, the control unit 101 further determines whether there is the image data that is yet to be transmitted to the mobile telephone 200. If the control unit 101 determines that there is image data that is yet to be transmitted, the processing proceeds to step S511. Meanwhile, if the control unit 101 determines that there is no image data that is yet to be transmitted, this processing for image transmission ends. After the end of image transmission processing, the control unit 101 cuts wireless LAN communication.

In step S511 the control unit 101 transmits the image data to the mobile telephone 200. Subsequently, in step S512 the control unit 101 determines whether transmission of the image data to the mobile telephone 200 succeeded. When the control unit 101 determines that transmission of the image data succeeded, the processing returns to step S510, and it is further determined whether there is another image yet to be transmitted. In addition, if the control unit 101 determined in step S512 that transmission of the image data failed, the processing proceeds to step S513.

In step S513 and step S514 the control unit 101 determines the reason for transmission failure, and decides processing that is to be executed subsequently. Here, because the data transmission has failed in relation to wireless LAN communication, the control unit 101 decides not to execute retransmission control. Here, the reasons for failure differ in that the determination in step S513 corresponds to a case in which a wireless LAN connection was established but there was a failure in transmission, and the determination in step S514 corresponds to a case in which there was a failure in establishment of a wireless LAN connection. However, in the present embodiment, configuration may be taken to not execute retransmission control in either case. Subsequently, this processing ends as an image transmission failure. After the image transmission failure, the control unit 101 cuts wireless LAN communication.

Explanation is given below for details of processing in step S506, step S513, and step S514 with reference to the flowchart of FIG. 6.

Firstly, in step S601 the control unit 101 determines a reason why the data transmission failed. In a case where the control unit 101 determined that there was a transmission failure because a problem occurred in Bluetooth communication, the processing proceeds to step S602. In step S602, executing Bluetooth connection processing for data retransmission control is decided. In addition, a case where the control unit 101 determined in step S601 that there was a transmission failure because a problem occurred in wireless LAN communication, the processing proceeds to step S603. In step S603, not to perform data retransmission control (not to perform wireless LAN connection processing) is decided. Problems in wireless LAN communication include a case in which a connection is cut during a data transmission as well as a case in which it was not possible to establish a wireless LAN connection between the digital camera 100 and the mobile telephone 200.

In addition, if the control unit 101 determined in step S601 that the transmission failure was due to another reason that is not a Bluetooth communication problem or a wireless LAN communication problem, the processing proceeds to step S604. In step S604, a decision not to perform data retransmission control is made. Here, the other reason may be for example a case in which a wireless LAN connection with the mobile telephone 200 is established without problem but an error notification is received from the mobile telephone 200. The mobile telephone 200 can perform an error notification to the digital camera 100 if a capacity of the storage medium 210 becomes full and no more image data can be stored, for example.

In the aforementioned explanation of FIG. 5, retransmission control is suppressed in step S604 if data transmission failed due to a wireless LAN communication problem, but configuration may be taken to control so as to perform retransmission control up to a predetermined number of times (for example one time), for example. In such a case, the control unit 101 holds a number of times to execute the retransmission control, and can decide not to perform retransmission control if the data transmission failed by a wireless LAN communication problem after the predetermined number of times of the retransmission control. In addition, in a case of performing retransmission control, the control unit 101 may gradually lengthen a time interval for executing retransmission control.

In this way, in the present embodiment, when performing a data transmission from the communication apparatus 100 to the external apparatus 200, setting information is exchanged after first establishing Bluetooth communication, and then switching to wireless LAN communication by a handover to perform the data transmission. Here the Bluetooth communication has lower power consumption than the wireless LAN communication. Therefore, by setting a frequency of retransmission to be higher in the Bluetooth communication than the wireless LAN communication, retransmission control with low power consumption is realized.

If a user, even part way through a data transmission for example, operates the power button of the operation unit 105 and the power supply of the digital camera 100 is turned off, the Bluetooth communication and the wireless LAN communication are both cut. However, if a user subsequently promptly operates the power button to turn the power supply of the digital camera 100 on, Bluetooth communication with the mobile telephone 200 is subsequently established.

Configuration may be taken to set a transmission failure for image data yet to be transmitted for which transmission has not completed after image capturing at this point, and not execute retransmission control. Alternatively, configuration may be taken to always manage a transmission status of a captured image, and transmit a captured image yet to be transmitted to the mobile telephone 200 each time Bluetooth communication with the mobile telephone 200 becomes possible in such a case, configuration may be taken such that, when the power button of the operation unit 105 is operated to turn on the power supply of the digital camera 100, image transmission processing is performed after checking whether there is image data yet to be transmitted, similarly to in step S502. In such a case, if a Bluetooth communication or wireless LAN communication environment for the digital camera 100 and the mobile telephone 200 is arranged, it is possible to automatically transmit an image captured by the digital camera 100 to the mobile telephone 200 without a user being conscious of this.

In the present embodiment above, explanation was given regarding control at a time of data transmission failure in a case of performing a handover for communication between a plurality of devices from short-range wireless communication (Bluetooth communication) in accordance with a first communication method to wireless communication (wireless LAN communication) in accordance with a second communication method, and performing data transmission between the devices. In particular, retransmission processing is performed if there was a problem in communication in accordance with the communication method having lower power consumption, and retransmission processing is restricted if there was a problem in relation to communication in accordance with the communication method having higher power consumption. Because of this, it is possible to reduce power consumption associated with retransmission control. In addition, when short-range wireless communication is possible, it is possible to automatically make a wireless LAN connection and transmit image data.

Second Embodiment

In the first embodiment, described above, captured image data is stored in the storage medium 110 after image capturing by the digital camera 100, and then the image data is read from the storage medium 110 and transmitted to the mobile telephone 200. In contrast to this, in the present embodiment explanation is given regarding a case in which transmission to the mobile telephone 200 is performed before storing to the storage medium 110.

Configurations of a communication apparatus, an external apparatus, and a system that correspond to the present embodiment are the same as those illustrated in FIG. 1 to FIG. 3. In addition, handover processing between the communication apparatus 100 and the external apparatus 200 is also similar to that illustrated in FIG. 4. In addition, for data transmission processing at a time of image capturing in a digital camera as the communication apparatus 100, basic processing is similar to that of FIG. 5 and FIG. 6, but some of the processing is different. FIG. 7 is a flowchart of operation of the communication apparatus 100 corresponding to the present embodiment, but the same reference numerals are added for similar operations to those explained by FIG. 5. With reference to FIG. 7, explanation is given below regarding operations that are different to those of the first embodiment in particular.

The control unit 101, in accordance with the release switch of the operation unit 105 having been pressed and SW2 becoming ON, controls the image capturing unit 102 to execute image capturing processing, and starts processing that corresponds to the flowchart of FIG. 7. In the first embodiment, when capturing is performed, in step S501 the control unit 101 executes processing for storing captured image data in the storage medium 110. In contrast to this, in the present embodiment the determination of whether Bluetooth communication is established is first executed in step S502. This is because data transmission is executed skipping the processing for storing to the storage medium 110 if Bluetooth communication between the digital camera 100 and the mobile telephone 200 is established at a time of capturing. At this point the control unit 101 may set image data held in the work memory 104 as data to be transmitted to the mobile telephone 200. In such a case, because transmission is possible without waiting for writing to the storage medium 110, it is possible to quickly transmit the image data to the mobile telephone 200.

However, if captured image data is held in the work memory 104 as is, there is a possibility that the capacity of the work memory 104 will be stressed and obstruct subsequent image capturing. Accordingly, if the control unit 101 determined in step S503 that Bluetooth communication is not established between the digital camera 100 and the mobile telephone 200, the processing proceeds to step S506, and, after processing explained in relation to FIG. 6 is executed, the processing proceeds to step S701. In step S701 the control unit 101 stores image data determined in step S502 to be an image yet to be transmitted in the storage medium 110. Configuration may be such that, thereafter, when executing data transmission, image data is read from the storage medium 110 and not just the work memory 104, and transmitted to the mobile telephone 200. After the image data is stored to the storage medium 110 in step S701, in step S507 the control unit 101 performs Bluetooth connection processing, waits for a Bluetooth communication with the mobile telephone 200 to be established, and subsequently repeats the processing from step S502.

Subsequently, the digital camera 100 operates as an access point in step 3508, and then if the control unit 101 determines in step S510 that there is no image data yet to be transmitted, after the control unit 101 decides not to execute retransmission control in step S513 or in step S514, image data not yet stored to the storage medium 110 is stored to the storage medium 110. Subsequently this processing ends and, the control unit 101 cuts wireless LAN communication. However, a timing at which the storage medium 110 stores unstored image data is not limited to that indicated here, and configuration may be taken to perform transmission of the image data to the mobile telephone 200 in parallel with storing of the image data to the storage medium 110.

As described above, in the present embodiment it is possible to perform a handover to wireless LAN communication after short-range wireless communication and transmit image data held in the work memory 104 to a mobile telephone without waiting to store the image data to the storage medium 110 after image capturing. By this, because it is possible to transmit without waiting for writing to the storage medium 110, it is possible to quickly transmit image data to the mobile telephone after image capturing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-095512, filed May 11, 2016, which is hereby incorporated by reference herein in its entirety.

What is claimed is:
1. A communication apparatus that communicates with an external apparatus to transmit data to the external apparatus, the communication apparatus comprising:
    a first communication unit configured to communicate with the external apparatus in accordance with a first communication method;

a second communication unit configured to communicate with the external apparatus in accordance with a second communication method; and a control unit configured to control operation in the first communication unit and the second communication unit, wherein the control unit controls so as to switch communication with the external apparatus a second communication by the second communication unit after performing a first communication by the first communication unit, and transmit transmission target data to the external apparatus in the second communication, the control unit sets a frequency, for repeatedly executing connection processing in accordance with the first communication method by controlling the first communication unit to establish the first communication in a case where the first communication cannot be established before the second communication, to be higher than a frequency for repeatedly executing connection processing in accordance with the second communication method by controlling the second communication unit to establish the second communication is a case where the second communication cannot be established after establishing the first communication, and the first communication has power consumption that is at least lower than that of the second communication.

2. The communication apparatus according to claim 1, wherein the control unit controls the first communication unit to repeatedly execute the connection processing in accordance with the first communication method, and controls the second communication unit to restrict repeated execution of the connection processing in accordance with the second communication method.

3. The communication apparatus according to claim 1, wherein the control unit controls the second communication unit to restrict a number of times for repeated execution of the connection processing in accordance with the second communication method to within a predetermined number of times.

4. The communication apparatus according to claim 3, wherein, in a case of repeatedly executing the connection processing within the predetermined number of times, the control unit lengthens an interval between executions of the connection processing each time the number of executions increases.

5. The communication apparatus according to claim 1, wherein the control unit suppresses retransmission processing of the transmission target data by the second communication unit upon determining that transmission of the transmission target data to the external apparatus failed after establishment of the second communication.

6. The communication apparatus according to claim 5, wherein the control unit determines that the transmission of the transmission target data to the external apparatus failed in accordance with a notification from the external apparatus.

7. The communication apparatus according to claim 1, further comprising a data generation unit configured to generate the data.

8. The communication apparatus according to claim 7, wherein the control unit controls the first communication unit to start establishment of the first communication with the external apparatus in accordance with generation of the data by the data generation unit.

9. The communication apparatus according to claim 7, wherein the data is image data, and the data generation unit functions as an image capturing unit.

10. The communication apparatus according to claim 7, wherein the control unit stores the data to a storage medium if the first communication is established at a time of generation of the data by the data generation unit, and subsequently the second communication cannot be established or the data cannot be transmitted to the external apparatus via the second communication, and stores the data to the storage medium and executes the connection processing in accordance with the first communication method if the first communication is not established at the time of the generation of the data by the data generation unit.

11. The communication apparatus according to claim 1, wherein the control unit controls the second communication unit restrict 0 times for repeated execution of the connection processing in accordance with the second communication method to within a predetermined number of times.

12. A method of controlling a communication apparatus that communicates with an external apparatus to transmit data to the external apparatus, the method comprising:

controlling operation in a first communication unit configured to communicate with the external apparatus in accordance with a first communication method and in a second communication unit configured to communicate with the external apparatus in accordance with a second communication method, wherein the controlling includes controlling so as to switch communication with the external apparatus to a second communication by the second communication unit after performing a first communication by the first communication unit, and transmit transmission target data to the external apparatus in the second communication, and setting a frequency, for repeatedly executing connection processing in accordance with the first communication method by controlling the first communication unit to establish the first communication in a case where the first communication cannot be established before the second communication, to be higher than a frequency for repeatedly executing connection processing in accordance with the second communication method by controlling the second communication unit to establish the second communication in a case where the second communication cannot be established after establishing the first communication, and the first communication has power consumption that is at least lower than that of toe second communication.

13. A non-transitory computer-readable storage medium storing a program that, when executed by a processor of a communication apparatus that communicates with an external apparatus to transmit data to the external apparatus, causes the processor to perform operations comprising:

controlling a first communication unit configured to communicate with the external apparatus in accordance with a first communication method and a second communication unit configured to communicate with the external apparatus in accordance with a second communication method, wherein the controlling includes controlling so as to switch communication with the external apparatus to a second communication by the second communication unit after performing a first communication by the first communication unit, and transmit transmission target data to the external apparatus in the second communication, and setting a frequency, for repeatedly executing connection processing in accordance with the first communication method by controlling the first communication unit to establish the first communication in a case where the first communication cannot be established before the second communication, to be higher than a frequency for repeatedly executing connection processing in accordance with the second communication method by controlling the second communication unit to establish the second communication in a case where the second communication cannot be established after establishing the first communication, and the first communication has power consumption that is at least lower than that of the second communication.

* * * * *